(12) United States Patent
Takai et al.

(10) Patent No.: US 11,279,313 B2
(45) Date of Patent: Mar. 22, 2022

(54) AIRBAG DOOR STRUCTURE

(71) Applicant: TOYODA GOSEI CO., LTD., Kiyosu (JP)

(72) Inventors: Hajime Takai, Kiyosu (JP); Chiharu Totani, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/068,071

(22) Filed: Oct. 12, 2020

(65) Prior Publication Data

US 2021/0107424 A1 Apr. 15, 2021

(30) Foreign Application Priority Data

Oct. 15, 2019 (JP) .............................. JP2019-188987

(51) Int. Cl.
*B60R 21/2165* (2011.01)
*B60R 21/205* (2011.01)
*B60R 21/217* (2011.01)
*B60R 21/207* (2006.01)

(52) U.S. Cl.
CPC ........ *B60R 21/2165* (2013.01); *B60R 21/217* (2013.01); *B60R 21/205* (2013.01); *B60R 21/207* (2013.01)

(58) Field of Classification Search
None
See application file for complete search history.

(56) References Cited

U.S. PATENT DOCUMENTS

| | | | |
|---|---|---|---|
| 9,045,107 B2 * | 6/2015 | Kim | .................... B60R 21/2165 |
| 9,126,559 B2 * | 9/2015 | Ito | ............................. B26D 3/06 |
| 2009/0278338 A1 | 11/2009 | Takahiro et al. | |

FOREIGN PATENT DOCUMENTS

| | | |
|---|---|---|
| JP | 2003-112595 A | 4/2003 |
| JP | 2005-162033 A | 6/2005 |
| JP | 2006_347393 A | 12/2006 |
| JP | 2008-137536 A | 6/2008 |
| JP | 2008-290643 A | 12/2008 |
| JP | 2009-067236 A | 4/2009 |
| JP | 2011-245926 A | 12/2011 |
| JP | 2017-202700 A | 11/2017 |
| KR | 100805453 B1 * | 2/2008 |

* cited by examiner

*Primary Examiner* — Faye M Fleming
(74) *Attorney, Agent, or Firm* — Posz Law Group, PLC (57) ABSTRACT

An airbag door structure includes a base material and a door member. The door member has a frame portion formed in a tubular shape and a first door portion and a second door portion which are partitioned while interposing a predetermined dividing line to be split when an airbag is deployed. The base material has a tear portion formed on an inner side of a frame than the frame portion in a back surface of the base material. The tear portion has a frame alongside portion formed along the frame portion, a dividing line portion formed along the predetermined dividing line, and a pair of protruding portions protruding toward the frame outside direction from the frame alongside portion and formed so that both skirt ends are connected to the frame alongside portion and vertices are connected to ends of the dividing line portion.

6 Claims, 7 Drawing Sheets

AIRBAG DOOR STRUCTURE

CROSS-REFERENCE TO RELATED APPLICATION(S)

This application is based upon and claims the benefit of priority from prior Japanese patent application No. 2019-188987 filed on Oct. 15, 2019, the entire contents of which are incorporated herein by reference.

BACKGROUND

1. Field of the Invention

The present invention relates to an airbag door structure.

2. Description of the Related Art

In the related art, an airbag door structure mounted on a vehicle or the like is known (for example, JP-A-2003-112595. JP-A-2017-202700, and JP-A-2011-245926). The airbag door structure is composed of a base material such as an instrument panel having a skin member arranged on a front side and a plate-shaped door member arranged on a back side of the base material. The base material has a tear portion formed on the back surface. The shape of this tear portion is, for example, a double Y type or an H type.

As described in JP-A-2003-112595 and JP-A-2017-202700, in the double Y type, the tear portion has a central tear line and four side tear lines. The central tear line extends so as to partition a first door portion and a second door portion of the rectangular door member. The four side tear lines include a side tear line extending from one end of the central tear line to a corner portion of the first door portion, a side tear line extending from one end of the central tear line to a corner portion of the second door portion, a side tear line extending from the other end of the central tear line to the corner portion of the first door portion, and a side tear line extending from the other end of the central tear line to the corner portion of the second door portion, Further, as described in JP-A-2011-245926, in the H type, the tear portion has a central tear line and two side tear lines. The central tear line extends so as to partition the first door portion and the second door portion of the rectangular door member. The side tear line is in contact with an end of the central tear line and extends in a direction orthogonal to the central tear line.

Assuming that the shape of the tear portion is the double Y type or the H type as described above, when the door member is split between the first door portion and the second door portion due to the deployment of the airbag, the skin member arranged on the front side of the base material needs to be broken in two directions. However, when the skin member needs to be broken in two directions, it becomes difficult to deal with a skin member made of a material that is easily cut in one direction but hard to be cut in the other direction, and it is difficult to adopt the skin member as the skin of the base material.

SUMMARY

The present invention is made in view of such points and an object thereof is to provide an airbag door structure capable of breaking a base material by splitting an airbag door so as to break a skin member in one direction when an airbag is deployed.

According to an aspect of the invention, there is provided an airbag door structure including: a base material having a skin member disposed on a front side; and a door member disposed on a back side of the base material, where: the door member has a frame portion formed in a tubular shape and a first door portion and a second door portion which are respectively connected to one side of the frame portion and are partitioned while interposing a predetermined dividing line to be split when an airbag is deployed; the base material has a tear portion formed on an inner side of a frame than the frame portion of the door member in a back surface of the base material; and the tear portion has a frame alongside portion formed along the frame portion of the door member, a dividing line portion formed along the predetermined dividing line, and a pair of protruding portions protruding toward the frame outside direction from the frame alongside portion and formed so that both skirt ends are connected to the frame alongside portion and vertices are connected to ends of the dividing line portion.

According to the aspect, when the airbag is deployed, the splitting of the door member and the breakage along the dividing line portion of the base material are performed so that an elliptical opening is formed. In this case, the base material is prevented from being broken along a direction orthogonal to the extending direction of the dividing line portion and the skin member is prevented from being broken along a direction different from the direction along the predetermined dividing line. That is, when the airbag is deployed, the door member is split between the first door portion and the second door portion so that the skin member is broken in one direction along the predetermined dividing line, and thus the base material can be broken along the dividing line portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Specific embodiments and modified embodiments of an airbag door structure according to the present invention will be described with reference to FIGS. 1 to 7.

An airbag door structure 1 of the embodiment is, for example, a structure of a door which splits when an airbag mounted on a vehicle is deployed. The airbag door structure 1 is applied to, for example, a door which is disposed in front of a passenger seat of a vehicle and which splits when protecting an occupant seated in the passenger seat. The airbag door structure 1 may be applied to a door disposed in front of a driver's seat of the vehicle.

The airbag door structure 1 includes a base material 10, a door member 20, and a skin member 30, as illustrated in FIGS. 1, 2, 3, and 4. The base material 10 is, for example, an instrument panel and is a member formed so that the entire surface is exposed in a passenger compartment. The base material 10 is formed by injecting a resin material, for example. The base material 10 has a substrate body portion 11 formed in a plate shape.

Figure 1:
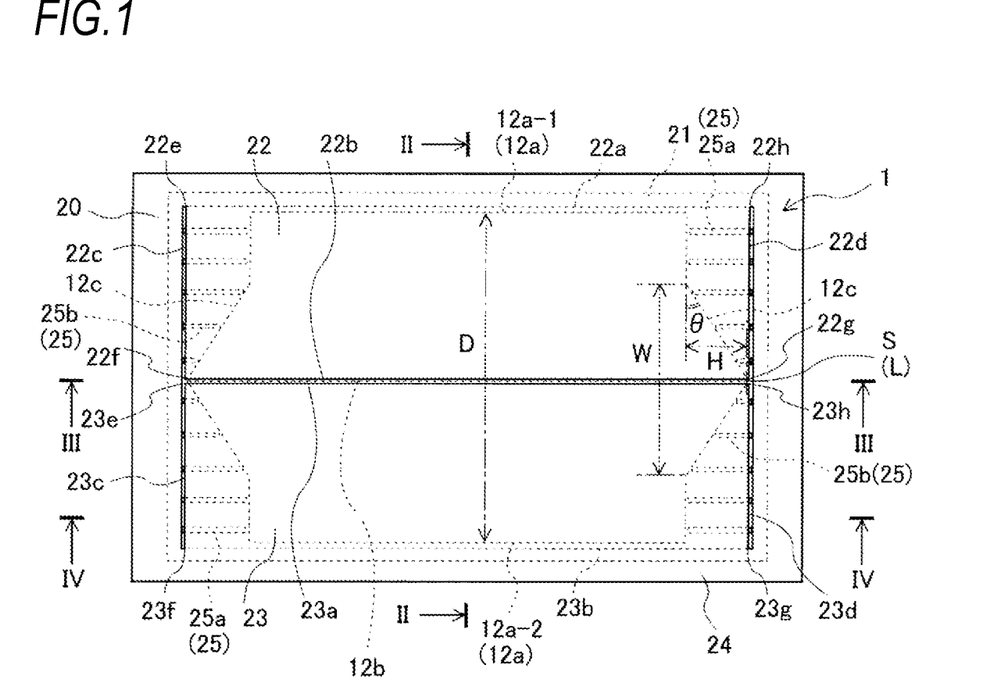
FIG. 1 is a front view of an airbag door structure (here, a state in which a base material and a skin member are removed) according to an embodiment.

The door member 20 is a door which splits when the airbag is deployed. The door member 20 is formed in a quadrangular shape (specifically, a rectangular shape). The door member 20 is formed by injecting a resin material, for example. The door member 20 is disposed on a back side of the base material 10. The door member 20 is attached and fixed to the base material 10. The door member 20 is formed in a plate shape as a whole. The door member 20 has a frame portion 21. The frame portion 21 is formed in a tubular shape (specifically, a quadrangular tube shape). The frame portion 21 forms an accommodation space for accommodating the airbag device.

The door member 20 has a first door portion 22 and a second door portion 23. The first door portion 22 and the second door portion 23 are arranged inside the frame of the frame portion 21. Each of the first door portion 22 and the second door portion 23 is connected to one side of the frame portion 21. One side of the frame part 21 to which the first door portion 22 is connected and one side of the frame part 21 to which the second door portion 23 is connected are a pair of sides facing each other and extending in parallel. The first door portion 22 and the second door portion 23 are partitioned while interposing a predetermined dividing line L to be split when the airbag is deployed. That is, the first door portion 22 and the second door portion 23 face each other with the predetermined dividing line L interposed therebetween. The predetermined dividing line L is a line formed in a straight line.

The first door portion 22 and the second door portion 23 are each formed in a quadrangular shape (specifically, a rectangular shape). The first door portion 22 has two long sides 22a and 22b extending parallel to each other, two short sides 22c and 22d extending parallel to each other, and corner portions 22e, 22f, 22g, and 22h where the long sides 22a and 22b and the short sides 22c and 22d intersect. The second door portion 23 has two long sides 23a and 23b extending parallel to each other, two short sides 23c and 23d extending parallel to each other, and corner portions 23e, 23f, 23g, and 23h where the long sides 23a and 23b and the short sides 23c and 23d intersect.

The long side 22b of the first door portion 22 close to the second door portion 23 and the long side 23a of the second door portion 23 close to the first door portion 22 are in contact with each other or face each other in a state of being separated from each other with a gap therebetween, and extend parallel to each other. The predetermined dividing line L described above extends linearly along the long side 22b and the long side 23a. In the following, it is assumed that there is a gap S between the long side 22b and the long side 23a.

The first door portion 22 is formed so that the long side 22a is connected to one side of the frame portion 21 while the long side 22b and the short sides 22c and 22d are not connected to the frame portion 21 and the like. The first door portion 22 is pivotable around the long side 22a. The second door portion 23 is formed so that the long side 23b is connected to one side of the frame portion 21 while the long side 23a and the short side 23c and 23d are not connected to the frame portion 21 and the like. The second door portion 23 is pivotable around the long side 23b.

An airbag device (not illustrated) is disposed on the back side of the door member 20. The airbag device is accommodated in the space within the frame portion 21 of the door member 20. The airbag device deploys the airbag in the frame portion 21 when a vehicle collides, for example. The airbag deployed in the frame portion 21 presses the first door portion 22 and the second door portion 23 of the door member 20 toward the passenger compartment side to split them, breaks the base material 10 along a dividing line portion 12b of a tear portion 12 which will be described below, and is inflated from the opening into the passenger compartment.

The door member 20 also has a flange portion 24. The flange portion 24 is disposed outside the frame of the frame portion 21 of the door member 20. The flange portion 24 extends from the outer edge of the frame portion 21 so as to protrude toward the outside of the frame. The flange portion 24 is flush with the first door portion 22 and the second door portion 23. The frame portion 21 described above extends from the back surfaces of the first door portion 22, the second door portion 23, and the flange portion 24 in a direction orthogonal to the back surface.

Figure 2:
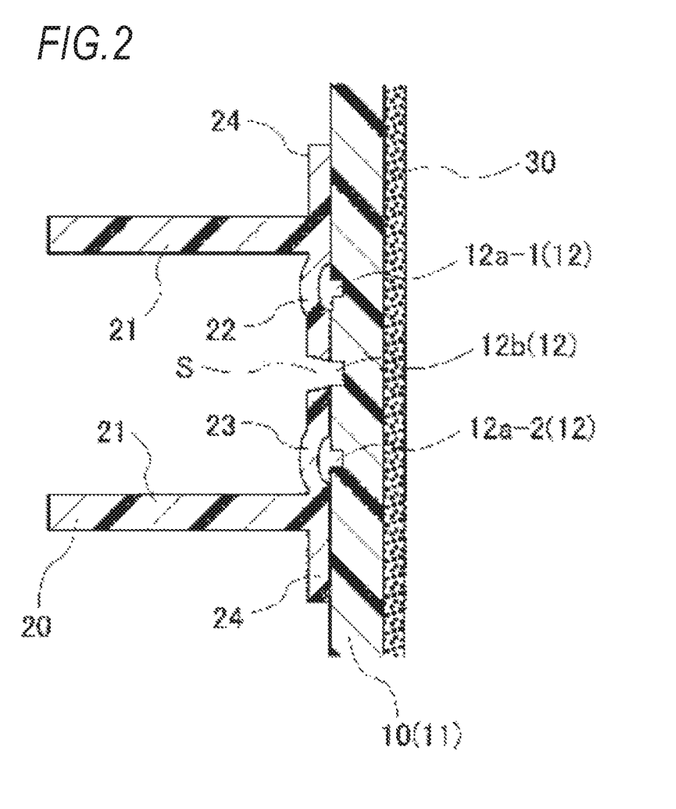
FIG. 2 is a cross-sectional view taken along the line II-II of the airbag door structure illustrated in FIG. 1
Figure 3:
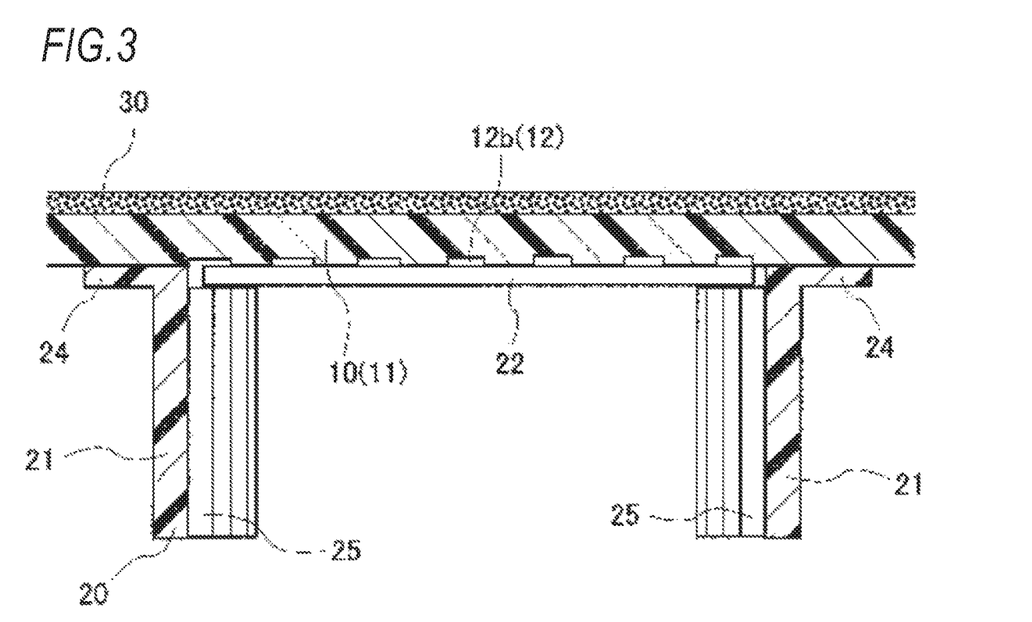
FIG. 3 is a cross-sectional view taken along the line III-III of the airbag door structure illustrated in FIG. 1
Figure 4:
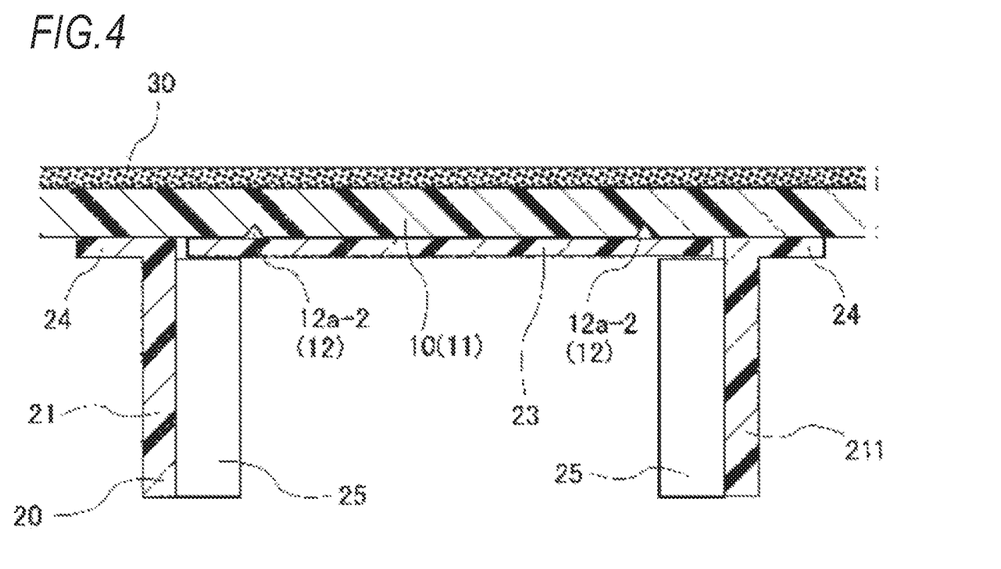
FIG. 4 is a cross-sectional view taken along the line IV-IV of the airbag door structure illustrated in FIG. 1.

The skin member 30 is a member which covers the surface of the base material 10. The skin member 30 is disposed on the front side of the base material 10. The skin member 30 is formed of a material which is cut in at least one direction, and for example, fabric or the like is used.

The base material 10 has the tear portion 12. The tear portion 12 is a portion for breaking or bending the base material 10 due to the pressure of the deployed airbag when the airbag is deployed. The tear portion 12 is formed on the back surface of the substrate body portion 11 so that the cross-sectional shape is a recessed groove shape or a V groove shape. The tear portion 12 is formed on an inner side of the frame than the frame portion 21 of the door member 20. The tear portion 12 is formed in a linear shape. The tear portion 12 has a frame alongside portion 12a, the dividing line portion 12b, and a protruding portion 12c.

The frame alongside portion 12a is a portion formed along the frame portion 21 of the door member 20. The frame alongside portion 12a includes a first door corresponding portion 12a-1 corresponding to the first door portion 22 and a second door corresponding portion 12a-2 corresponding to the second door portion 23. On the back surface of the substrate body portion 11, the first door corresponding portion 12a-1 extends in parallel along the long side 22a of the first door portion 22 opposite to the second door portion 23. Further, the first door corresponding portion 12a-1 is formed in a U shape so as to extend in parallel along a part of each of the two short sides 22c and 22d. On the back surface of the substrate body portion 11, the second door corresponding portion 12a-2 extends in parallel along the long side 23b of the second door portion 23 opposite to the first door portion 22. Further, the second door corresponding portion 12a-2 is formed in a U shape so as to extend in parallel along a part of each of the two short sides 23c and 23d.

The frame alongside portion 12a is provided so as to be relatively close to the long sides 22a and 23b and is provided so as to be relatively far from the short sides 22c, 22d, 23c, and 23d. That is, the frame alongside portion 12a is formed so that the distance to the long sides 22a and 23b is short and the distance to the short sides 22c, 22d, 23c, and 23d is long.

The dividing line portion 12b is a portion formed along the predetermined dividing line L. The dividing line portion 12b extends linearly along the long side 22b of the first door portion 22 and the long side 23a of the second door portion 23. The dividing line portion 12b is formed so that one end is located close to the corner portion 22f where the long side 22b and the short side 22c of the first door portion 22 intersect or the corner portion 23e where the long side 23a and the short side 23c of the second door portion 23 intersect and the other end is located close to the corner portion 22g where the long side 22b and the short side 22d of the first door portion 22 intersect or the corner portion 23h where the long side 23a and the short side 23d of the second door portion 23 intersect. The dividing line portion 12b is formed so that the length thereof is longer than the length along the long sides 22a and 23a of the frame alongside portion 12a.

The protruding portion 12c is a portion protruding toward the frame outside direction closer to the frame portion 21 of the door member 20 than the frame alongside portion 12a. The protruding shape of the protruding portion 12c may be a triangular shape with angular vertices or a mountain shape such as a semicircular shape with smooth vertices. The protruding portions 12c are respectively provided on the side of the short sides 22c and 23c and the side of the short sides 22d and 23d of the door member 20. Each protruding portion 12c is connected to the frame alongside portion 12a.

Specifically, the protruding portion 12c on the side of the short sides 22c and 23c (left side in FIG. 1) is interposed between one end of the first door corresponding portion 12a-1 and one end of the second door corresponding portion 12a-2 of the frame alongside portion 12a. In addition, the protruding portion 12c on the side of the short sides 22d and 23d (right side in FIG. 1) is interposed between the other end of the first door corresponding portion 12a-1 and the other end of the second door corresponding portion 12a-2 of the frame alongside portion 12a. The pair of protruding portion 12c and frame alongside portion 12a form an annular shape as a whole.

The protruding portion 12c on the side of the short sides 22c and 23c is protruded toward the frame outside direction (left side in FIG. 1) on the side of short sides 22c and 23c than portions of the frame alongside portion 12a parallel to the short sides 22c and 23c of the first door corresponding portion 12a-1 and the second door corresponding portion 12a-2. The protruding portion 12c on the side of the short sides 22c and 23c is formed so that skirt ends on both sides are connected to one end of the first door corresponding portion 12a-1 and one end of the second door corresponding portion 12a-2 and the vertex is connected to one end (left end in FIG. 1) of the dividing line portion 12b.

The protruding portion 12c on the side of the short sides 22d and 23d is protruded toward the frame outside direction (right side in FIG. 1) on the side of the short sides 22d and 23d than portions of the frame alongside portion 12a parallel to the short sides 22d and 23d of the first door corresponding portion 12a-1 and the second door corresponding portion 12a-2. The protruding portion 12c on the side of the short sides 22d and 23d is formed so that skirt ends on both sides are connected to the other end of the first door corresponding portion 12a-1 and the other end of the second door corresponding portion 12a-2 and the vertex is connected to the other end (right end in FIG. 1) of the dividing line portion 12b.

As illustrated in FIG. 1, a distance W between the skirt ends on both sides of the protruding portion 12c is preferably set to, for example, 10% to 100% of a distance D between the side parallel to the long sides 22a and 22b of the first door corresponding portion 12a-1 of the frame alongside portion 12a and the side parallel to the long sides 23a and 23b of the second door corresponding portion 12a-2 of the frame alongside portion 12a. Further, a height H from the skirt end to the vertex of the protruding portion 12c is preferably set to, for example, 30% to 150% of the distance W between the skirt ends on both sides thereof. Further, an angle θ of a line connecting the skirt end and the vertex of the protruding portion 12c is preferably set to, for example, 20° to 70° with respect to the side parallel to the short sides 22c, 22d, 23c, and 23d in the frame alongside portion 12a.

The pair of protruding portions 12c are formed so that the respective vertices overlap the predetermined dividing line L and the two vertices are located at two different points on the predetermined dividing line L. A distance between the vertices of the pair of protruding portions 12c matches the length of the dividing line portion 12b and is longer than the length along the long sides 22a and 23a of the frame alongside portion 12a.

The door member 20 has a rib 25. The rib 25 is a portion which reinforces the frame portion 21 to improve the pressure resistance when the airbag is deployed and limits the pressing position on the door member 20 pressed by the deployed airbag. The rib 25 is integrated with the frame portion 21. The rib 25 is connected to the inner surface of the tubular portion of the frame portion 21. The rib 25 is formed on the inner side of the frame than the frame portion 21 and on the outer side of the frame than the tear portion 12 of the base material 10. The rib 25 extends linearly from the frame portion 21 to the tear portion 12 and also extends linearly along the direction in which the tubular portion of the frame portion 21 extends. The rib 25 is formed in a plate shape.

A plurality of ribs 25 are provided. Each rib 25 extends in parallel to the predetermined dividing line L from the frame portion 21 to the tear portion 12 and the end portion on the tear portion 12 side is formed so as to be located close to the tear portion 12. The rib 25 includes a long rib 25a and a short rib 25b. The long rib 25a extends from the frame portion 21 to portions parallel to the short sides 22c, 22d, 23c, and 23d of the first door corresponding portion 12a-1 and the second door corresponding portion 12a-2 of the frame alongside portion 12a of the tear portion 12 so as to connect them. The short rib 25b extends from the frame portion 21 to the protruding portion 12c of the tear portion 12 so as to connect them.

The extension length between the frame portion 21 and the tear portion 12 in the short rib 25b is shorter than the extension length between the frame portion 21 and the tear portion 12 in the long rib 25a. Further, the extension length between the frame portion 21 and the tear portion 12 in the short rib 25b is as short as the short rib 25b close to the predetermined dividing line L.

In the airbag door structure 1 described above, when the airbag is deployed in the frame portion 21 of the door member 20, the airbag advances in the frame portion 21 along the frame inner surface of the frame portion 21 and the tip of the rib 25 and presses the first door portion 22 and the second door portion 23 toward the passenger compartment side. When this pressing occurs, the first door portion 22 and the second door portion 23 are respectively deformed so as to pivot around the sides connected to the frame portion 21, and the door member 20 is split along the predetermined dividing line L.

When the door member 20 is split along the predetermined dividing line L, the base material 10 is integrated with the skin member 30 and pressed from the door member 20 toward the passenger compartment side. When this pressing occurs, the base material 10 is bent along the frame alongside portion 12a and the protruding portion 12c of the tear portion 12 and is broken so as to be divided into two parts along the dividing line portion 12b of the tear portion 12. In this case, the skin member 30 breaks in the same manner as the base material 10 (see FIGS. 5 and 6).

Figure 5:
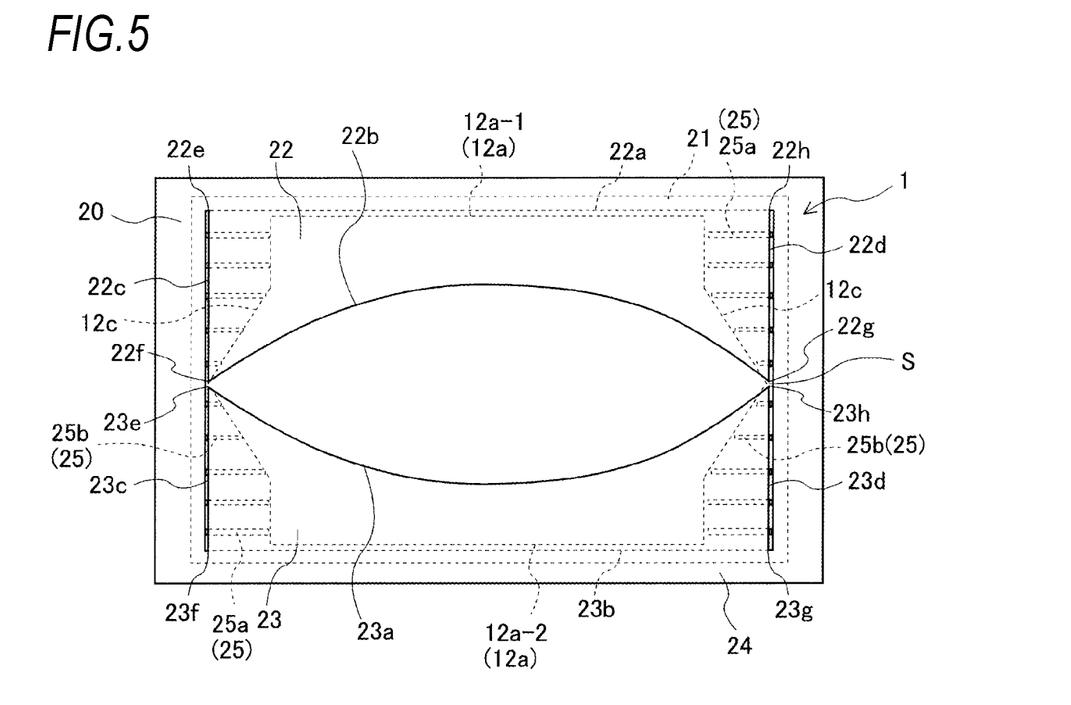
FIG. 5 is a front view of the airbag door structure of the embodiment when an airbag is deployed.
Figure 6:
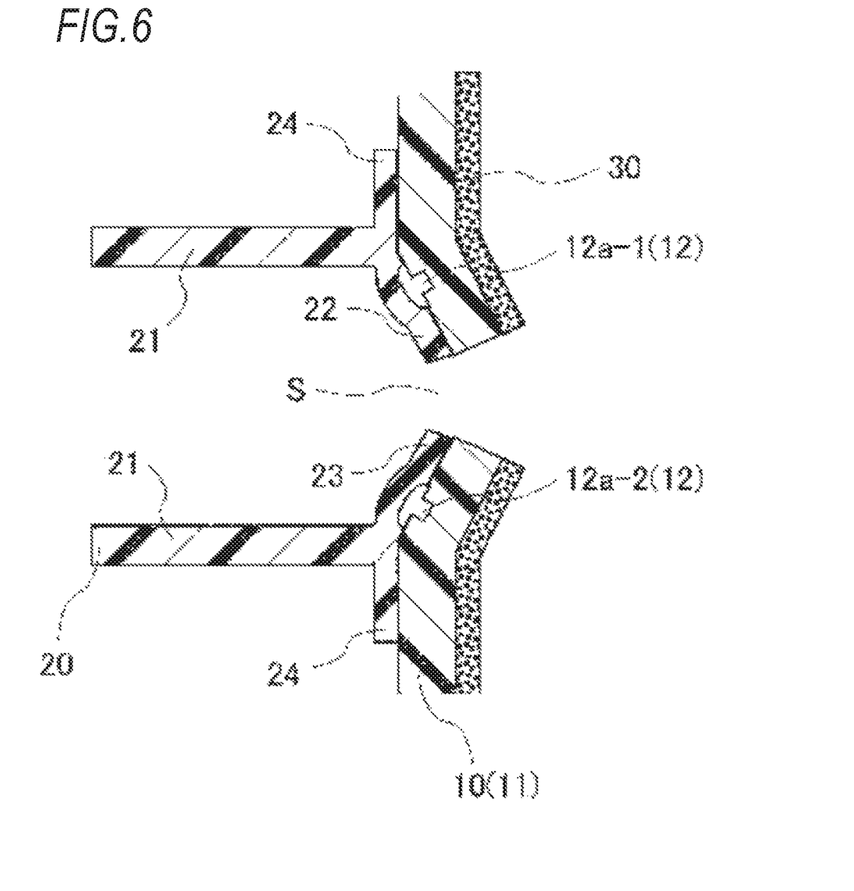
FIG. 6 is a cross-sectional view taken along the line II-II of the airbag door structure of the embodiment when the airbag is deployed.

When the airbag presses the first door portion 22 and the second door portion 23, a larger pressing force acts toward the center of the door member 20. In addition, the base material 10 has a pair of protruding portions 12c which respectively protrude in the frame outside direction from the frame alongside portion 12a and the dividing line portion 12b which connects the vertices of the protruding portions 12c. The length of the dividing line portion 12b in which the base material 10 is broken is longer than the length along the long sides 22a and 23a of the frame alongside portion 12a in which the base material 10 is bent. Therefore, as illustrated in FIG. 5, the above-described splitting of the door member 20 and breakage along the dividing line portion 12b of the base material 10 are performed so that the opening shape is an elliptical shape (that is, a fish mouth type) that is larger toward the center of the dividing line portion 12b and smaller toward the end of the dividing line portion 12b.

Then, when the above-mentioned splitting of the door member 20 and breakage along the dividing line portion 12b of the base material 10 occur, the airbag is inflated into the passenger compartment through the openings of the splitting portions of the door member 20 or the breakage portions of the base material 10 and the skin member 30. As a result, the vehicle occupant is protected by the inflated airbag.

In this way, in the airbag door structure 1, when the airbag is deployed, the splitting of the door member 20 and the breakage of the base material 10 along the dividing line portion 12b are performed so that an elliptical (for example, fish mouth-type) opening is formed. When such splitting or breakage occurs, the base material 10 is prevented from being broken along the direction orthogonal to the extending direction of the dividing line portion 12b, and thus the skin member 30 is prevented from being broken along a direction different from the direction along the predetermined dividing line L.

That is, when the airbag is deployed, the door member 20 is split between the first door portion 22 and the second door portion 23 so that the skin member 30 is broken in one direction along the predetermined dividing line L, and thus the base material 10 can be broken along the straight dividing line portion 12b. Therefore, in the airbag door structure 1, it is sufficient to use a material, which can be broken in at least one direction, as the material of the skin member 30 that covers the front side of the base material 10, and thus the material used as the skin member 30 can be expanded to a wide range.

In the airbag door structure 1 described above, the rib 25 is formed on the inner side of the frame than the frame portion 21 of the door member 20 and on the outer side of the frame than the tear portion 12 of the base material 10. According to this rib 25, it is possible to limit the pressing position of the door member 20 pressed by the deployed airbag mainly to the area on the inner side of the frame of the tear portion 12 of the base material 10. Therefore, the bending and breaking of the base material 10 when the airbag is deployed can be concentrated at the position along the tear portion 12, and thus the bending and breaking of the base material 10 can be easily controlled to a desired state.

In particular, the rib 25 described above is integrated with the frame portion 21 and extends linearly from the frame portion 21 to the tear portion 12. Therefore, it is possible to easily realize the form of the rib 25 for reinforcing the frame portion 21 and limiting the pressing position of the door member 20 pressed by the airbag.

In addition, the rib 25 includes the long rib 25a extending from the frame portion 21 to a portion parallel to the short sides 22c, 22d, 23c, and 23d in the frame alongside portion 12a of the tear portion 12 and the short rib 25b extending from the frame portion 21 to the protruding portion 12c of the tear portion 12. In this configuration, the line connecting the tips of the ribs 25 is along the frame alongside portion 12a and the protruding portion 12c of the tear portion 12. Therefore, the base material 10 can be easily bent and broken along the tear portion 12 including the protruding portion 12c.

Further, the rib 25 extends parallel to the predetermined dividing line L from the frame portion 21 to the tear portion 12. In this configuration, it is not necessary to form the rib 25 along the frame alongside portion 12a or the protruding portion 12c of the tear portion 12 or in the wall plate shape parallel to the frame alongside portion 12a or the protruding portion 12c, and as the rib 25, both the function of reinforcing the frame portion 21 and the function of limiting the pressing position of the door member 20 pressed by the airbag can be realized.

Figure 7:
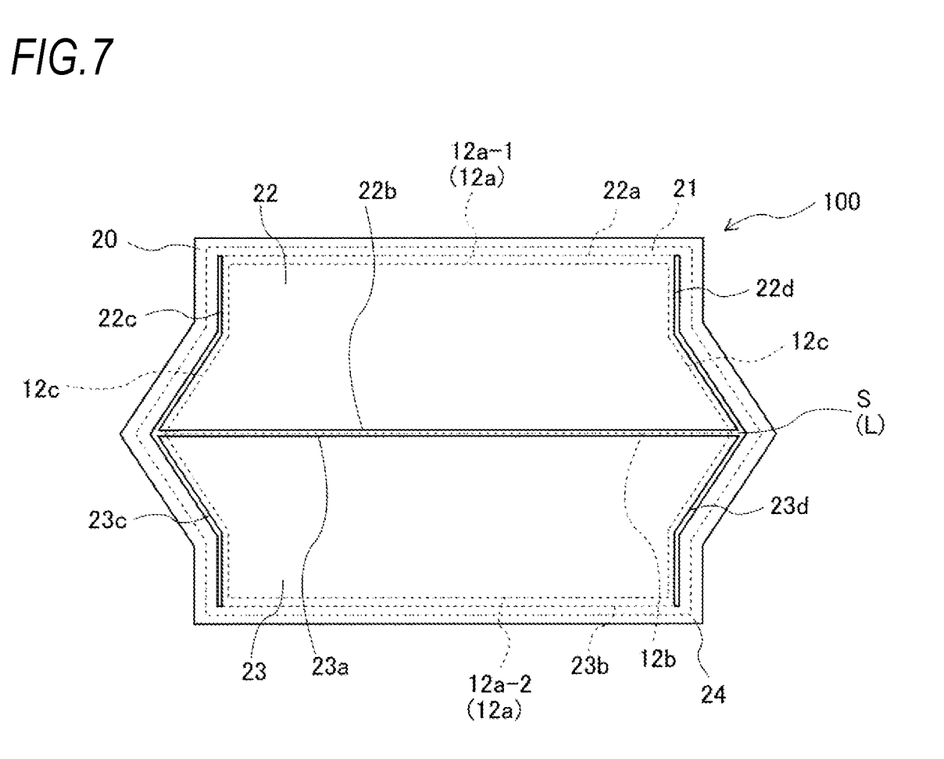
FIG. 7 is a front view of an airbag door structure according to a modified embodiment.

In the embodiment described above, the frame portion 21 of the door member 20 is formed in a quadrangular tube shape, and the tear portion 12 of the base material 10 is not formed on the back surface of the substrate body portion 11 in a quadrangular shape that simply matches the shape of the frame portion 21 of the door member 20 but is formed in a shape having the protruding portion 12c protruding from the frame alongside portion 12a in the frame outside direction. However, the present invention is not limited thereto and the airbag door structure may be a structure 100 as illustrated in FIG. 7.

That is, in this airbag door structure 100 of the modified embodiment, the shape of the frame portion 21 of the door member 20 may be a tubular shape that matches the shapes of the frame alongside portion 12a and the protruding portion 12c of the tear portion 12 of the base material 10. The frame portion 21 is formed in a tubular shape along the frame alongside portion 12a and the protruding portion 12c of the tear portion 12 of the base material 10 and the sides of the short sides 22c and 22d side of the first door portion 22 and the sides of the short sides 23c and 23d of the second door portion 23 are formed in a shape including corners so as to be along the inner surface the tubular portion of the frame portion 21, that is, to be along the frame alongside portion 12a and the protruding portion 12c of the tear portion 12 of the base material 10.

In this modified embodiment, it is possible to obtain the same effect as that of the embodiment described above, and unlike the embodiment described above, it is not necessary to form the rib 25 on the door member 20.

The present invention is not limited to the above-described embodiment or modified embodiment and various modifications can be made without departing from the spirit of the present invention.

What is claimed is:

1. An airbag door structure comprising:
a base material having a skin member disposed on a front side; and a door member disposed on a back side of the base material, wherein:

the door member has a frame portion formed in a tubular shape and a first door portion and a second door portion which are respectively connected to one side of the frame portion and are partitioned while interposing a predetermined dividing line to be split when an airbag is deployed;

the base material has a tear portion formed on an inner side of a frame than the frame portion of the door member in a back surface of the base material; and the tear portion has a frame alongside portion formed along the frame portion of the door member, a dividing line portion formed along the predetermined dividing line, and a pair of protruding portions protruding toward the frame outside direction from the frame alongside portion and formed so that skirt ends are connected to the frame alongside portion and vertices are connected to ends of the dividing line portion.

2. The airbag door structure according to claim 1, wherein the door member has a rib formed on the inner side of the frame than the frame portion of the door member and on the outer side of the frame than the tear portion.

3. The airbag door structure according to claim 2, wherein the rib includes a short rib extending from the frame portion of the door member to the protruding portion of the tear portion.

4. The airbag door structure according to claim 2, wherein the rib extends from the frame portion of the door member to the tear portion in parallel to the predetermined dividing line.

5. The airbag door structure according to claim 1, wherein the frame portion of the door member is formed in a quadrangular tube shape.

6. The airbag door structure according to claim 1, wherein the frame portion of the door member is formed in a tubular shape which matches the shapes of the frame alongside portion and the protruding portion of the tear portion.

* * * * *